United States Patent [19]

Gardner et al.

[11] 4,103,211

[45] Jul. 25, 1978

[54] DYNAMIC DRAG ARRANGEMENT FOR ELECTRICALLY PROPELLED TRACTION VEHICLES

[75] Inventors: Alvin Leonard Gardner; Barry Jay Turley, both of Erie, Pa.

[73] Assignee: General Electric Company, Erie, Pa.

[21] Appl. No.: 762,692

[22] Filed: Jan. 26, 1977

[51] Int. Cl.² ............................................... H02P 3/14
[52] U.S. Cl. ...................................... 318/87; 318/376
[58] Field of Search ...................... 318/87, 86, 88, 89, 318/376, 375

[56] References Cited

U.S. PATENT DOCUMENTS

| | | | |
|---|---|---|---|
| 3,651,388 | 3/1972 | Machin, Jr. et al. | 318/88 |
| 3,728,599 | 7/1971 | Minami | 318/376 |
| 4,010,407 | 3/1977 | Lombard | 318/87 |

*Primary Examiner*—Herman J. Hohauser

*Attorney, Agent, or Firm*—James H. Beusse

[57] ABSTRACT

A propulsion system for traction vehicles utilizing separately excited electric traction motors in which a level of reverse motor torque is produced when speed control is released to effect a dynamic drag on the vehicle. The system simulates in an electric vehicle the dynamic drag effect characteristic of an internal combustion engine driven vehicle when the accelerator is released. The effect is attained by providing a motor armature regenerative current path through a load resistor and by maintaining motor field current at a selected minimum level when the speed control is released. A function generator adapted to regulate motor field current as a function of motor armature current provides a minimum field current signal when armature current is less than a selected value to thereby maintain field current and motor torque when the speed control is released.

12 Claims, 5 Drawing Figures

DYNAMIC DRAG ARRANGEMENT FOR ELECTRICALLY PROPELLED TRACTION VEHICLES

BACKGROUND OF THE INVENTION

The present invention is directed to control systems for electric motor driven traction vehicles and, more particularly, to a control system which provides a dynamic drag effect when a vehicle speed control pedal is released.

Electric motor driven traction vehicles such as large earthmoving machines typically comprise a prime mover driving a generator or alternator which provides electrical energy to high horsepower electric motors connected in driving relationship to wheels of the vehicles. The prime mover is commonly a diesel engine and the electric motors are generally variable speed reversible direct current motors. A vehicle operator controls the vehicle speed and direction of travel, i.e., forward or reverse, by manipulation of a speed control pedal and a forward-reverse selector lever. The speed control pedal is adapted to control the diesel engine speed (RPM) which controls the power output of the generator or alternator thus varying the energy supplied to the electric motors. The forward-reverse selector lever is usually adapted to operate switches to control the direction in which current passes through the motor field windings.

In prior art electric propulsion systems, a desired reduction in speed of the vehicle is accomplished by releasing the speed control pedal and either allowing the vehicle to coast or activating the mechanical or the electrical braking system of the vehicle. Releasing the speed control pedal allows the prime mover to slow thus reducing the generator terminal voltage. When the generator terminal voltage becomes less than the CEMF of the traction motor armature, current reverses and flows from the motor armature to the generator. The motor field excitation circuit responds to the reduction in current flow from generator to motor and correspondingly reduces field excitation, achieving zero field excitation at substantially the same time as armature current reverses. With field excitation removed the motors free-wheel, i.e., removing field excitation is equivalent to disengaging the clutch in an internal combustion engine driven automobile with a standard transmission. If the vehicle is proceeding down a slight incline, removing excitation to the motors may not reduce the forward speed since the motors free-wheel. In addition, the lack of any traction motor resistance to rotation allows the vehicle forward momentum to remain substantially constant and results in an undesirable "feel" to the operator as compared to a non-electric vehicle which presents a drag effect when the speed control pedal is released due to the wheels causing the engine and transmission parts to continue to rotate.

OBJECT OF THE INVENTION

It is an object of the present invention to provide an electric propulsion system for a traction vehicle which system provides a dynamic drag effect when the speed control pedal is released.

SUMMARY

In carrying out the present invention in one form, a traction vehicle is equipped with a propulsion system having separately excited electric traction motors so controlled that the propulsion system responds with a dynamic drag effect when a vehicle speed control pedal is released. In a preferred embodiment the system includes a first electrical power source, e.g., a self-excited direct current generator driven by an internal combustion engine, adapted to supply electrical power to an armature of a traction motor. Serially connected between one terminal of the first source and one terminal of the armature is a unidirectional conduction device, e.g., one or more power diodes, whereby current may pass freely from the first square to the armature when the source voltage exceeds the armature terminal voltage. A power resistance is connected in parallel circuit arrangement with the unidirectional conduction device whereby regenerated current flowing from the motor armature to the generator will follow a current path through the power resistance. A current sensor is connected to provide a current signal representative of the magnitude and polarity of current passing through the motor armature. This current signal is supplied to a function generator. The function generator is adapted to provide a motor field current reference signal as a predetermined function of the armature current signal. The reference signal is limited to a selected minimum value, increasing above this minimum value in response to an increase in the magnitude of the current signal above a selected value. The reference signal is supplied to a second electrical power source which in turn responds to the reference signal and supplies excitation to the traction motor field winding. With this arrangement the magnitude of excitation supplied to the field winding is functionally dependent upon the magnitude of current in the motor armature circuit. However, for values of armature current less than a selected magnitude, field current remains constant at the selected minimum value. Accordingly, when the speed control pedal is released allowing the excitation voltage of the first source to decrease, current in the armature will rapidly be reduced and will reverse direction when the motor CEMF exceeds the first source excitation voltage. The reverse current will flow from the motor armature through the power resistance and the first source. Since the field current has been limited to the selected minimum value and does not reverse polarity, the flux produced in the field will react with the flux of the armature to create a retarding effect on the rotation of the motor. By appropriate selection of the minimum level of field current and the sizing of the power resistance, the degree of retarding effect can be varied as desired.

BRIEF DESCRIPTION OF THE DRAWINGS

The invention will be better understood and its objects and advantages more fully appreciated by the following description taken in conjunction with the accompanying drawings in which.

DETAILED DESCRIPTION

Figure 1:
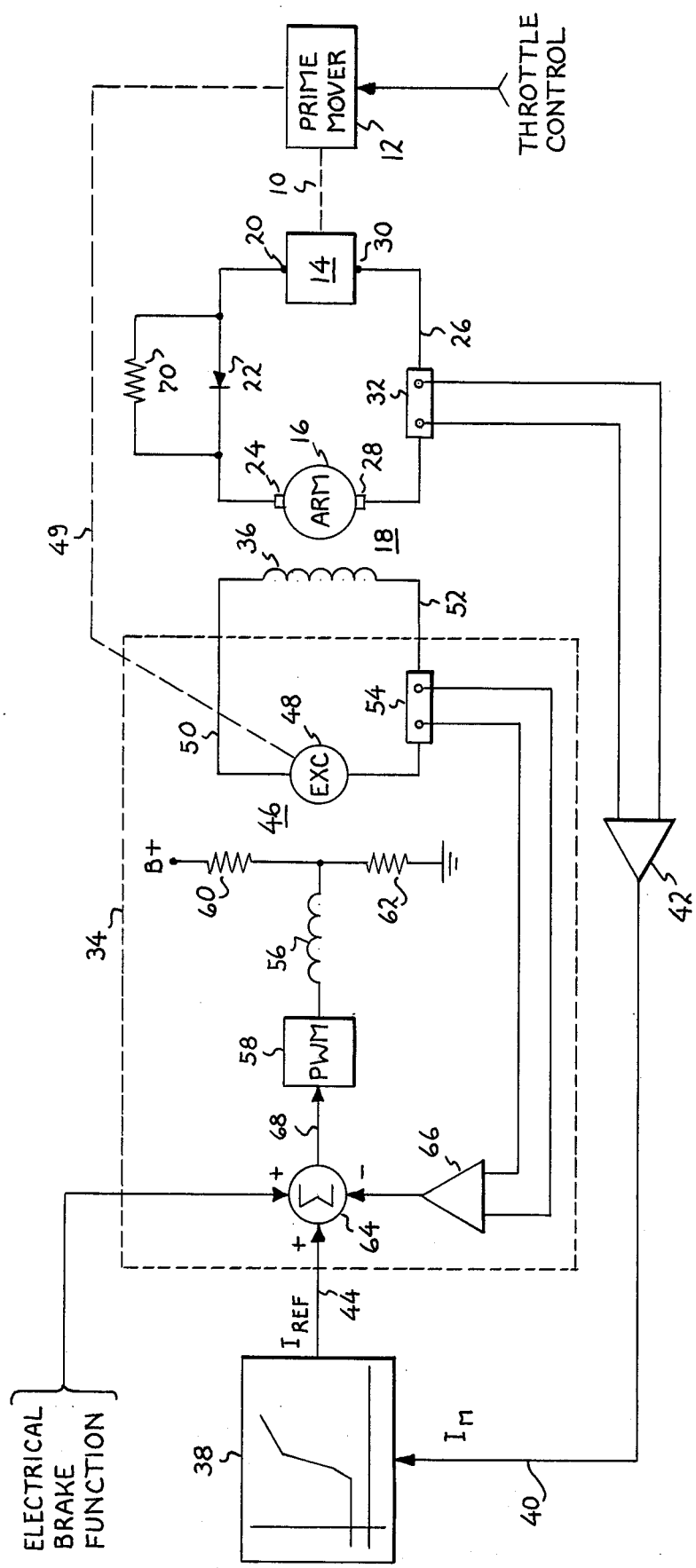
FIG. 1 is a simplified schematic of a preferred form of the present invention in a separately excited traction motor circuit.

FIG. 1 is a simplified block diagram of an electrical propulsion system according to the present invention. A control (not shown), which may be, for example, a speed control pedal or a throttle control, is adapted to control a prime mover 12 which may be, for example, a diesel engine. The control may be arranged to operate a governor and thus to control the revolutions-per-minute (RPM) and power output of the engine. A drive shaft of prime mover 12, indicated by the dotted line 10, is connected in driving relationship to a direct current generator 14, which generator 14 is preferably a self-excited generator of a type well known in the art. Prime mover 12 and generator 14 comprise a controllable electrical power source and accordingly, could be replaced in toto or in part by other types of controllable electrical power sources having the characteristics necessary to implement the present inventive propulsion system, namely having a controllable variable output excitation and a reverse current path.

Generator 14 is connected to supply excitation to an armature 16 of a separately excited direct-current (d-c) electric traction motor 18. Excitation current is supplied from terminal 20 of generator 14 through a unidirectional conduction device, illustrated as a power diode 22, to terminal 24 of armature 16. The current path between armature 16 and generator 14 is completed by a line 26 interconnecting terminal 28 of armature 16 and terminal 30 of generator 14. A current shunt 32 connected in line 26 provides a signal representative of current through the motor armature 16. Since for traction motor applications generator 14 may supply several hundred amperes of current at several hundred volts of potential, diode 22 may comprise a plurality of semiconductor diodes connected in series-parallel circuit arrangement to accommodate the operating power levels.

Although source 34 may take the form of any of the well known electrical power sources, a preferred embodiment is illustrated in FIG. 1. In this embodiment a rotating exciter, e.g., a generator 46, has an armature 48 connected to supply excitation to field winding 36 via lines 50 and 52. Armature 48 is connected to be rotatably driven by prime mover 12 as indicated by dotted line 49. A current shunt 54 connected in line 52 provides a signal representative of current through the field winding 36. The generator 46 includes a field winding 56 whose level of excitation in conjunction with the rotational velocity of armature 48 controls the power output of armature 48. Excitation for field winding 56 is provided by a pulse width modulator (PWM) 58 of a type well known in the art. It will be noted that field winding 56 has one terminal connected to PWM 58 and a second terminal connected to a junction intermediate resistors 60 and 62. The resistors 60 and 62 are connected between a voltage source B+ and neutral thereby forming a voltage divider which biases the second terminal of field winding 56 to a positive voltage. The purpose of the biasing arrangement is to provide a reverse drive excitation for the winding 56 to thereby effect a more rapid turn-off, such biasing being a well known expedient in the art. The excitation current supplied by PWM 58 is determined by the current reference signal from function generator 38 on line 44 which is compared with a current feeback signal in summing junction 64. The current feedback signal is developed at an output terminal of a differential amplifier 66, which amplifier 66 has first and second input terminals connected to corresponding terminals of current shunt 54. The signal developed at the output terminal of summing junction 64 is an error signal representing the difference between the current reference signal and the signal representative of current through field winding 36. This error signal is supplied via line 68 to PWM 58. PWM 58 responds to the error signal and controls the excitation to field winding 56 in such a manner as to minimize the error signal.

Figure 2:
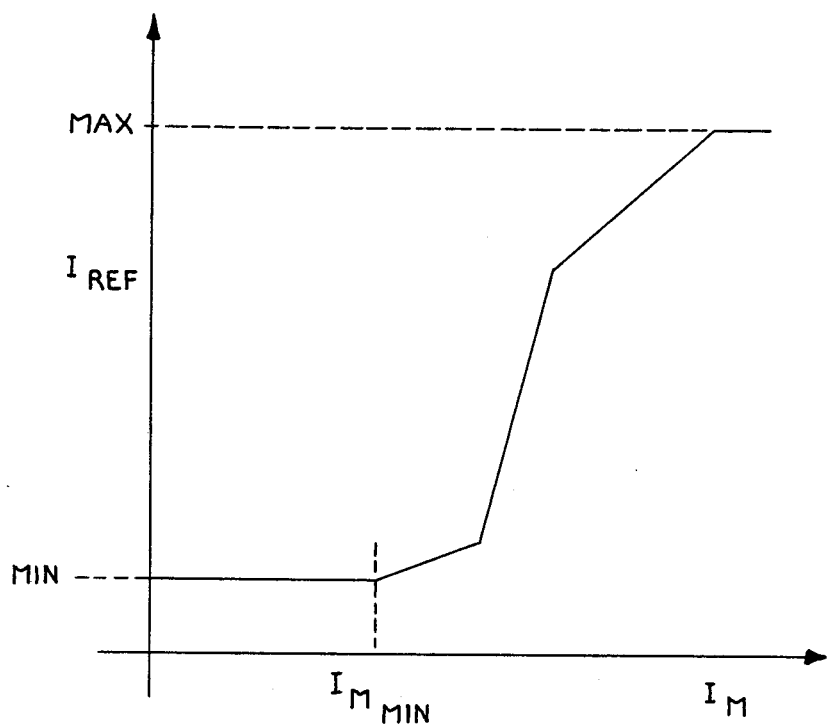
FIG. 2 is a graph of a desired functional relationship between motor armature current and motor field current for a traction vehicle using the present invention.

Before completing the description of FIG. 1, reference is made to FIG. 2 wherein there is shown a graph of the function implemented in function generator 38. The vertical axis $I_{REF}$ represents the magnitude of the current reference signal produced on line 44 at the output of function generator 38. The horizontal axis $I_M$ represents the magnitude of the armature current feedback signal on line 40 which is applied as an input signal to function generator 38. The $I_M$ axis represents armature current magnitudes for the case in which the terminal voltage of generator 14 exceeds the CEMF of armature 16. It should be noted that for values of $I_M$ less than $I_{M_{min}}$, $I_{REF}$ remains at a predetermined minimum level. This minimum level of $I_{REF}$ is selected to cause a minimum magnitude of excitation to be produced by exciter 46 and applied to motor field winding 36. A typical minimum level of excitation for field winding 36 is approximately 25 percent of maximum allowable motor field current. The functional relationship between $I_{REF}$ and $I_M$ above the excitation level $I_{M_{min}}$ is determined in accordance with well known techniques in order to control the horsepower output of the motor 18. The minimum level of motor armature current $I_{M_{min}}$ is a matter of design choice and may depend upon the type of vehicle being operated. In some instances $I_{M_{min}}$ may desirably be set at zero armature current so that the motor field current reaches the minimum level just when armature current reversal occurs. The indicated relationship may vary with the type of motor or generator being used. A more detailed discussion of horsepower limit control and the use of a function generator for such control is given in U.S. Pat. No. 3,105,186 - Zelina, issued September 24, 1963 and assigned to the General Electric Company. Techniques for designing function generators are disclosed, for example, on pages 482 et seq. of the book Analog Computation by Albert S. Jackson (McGraw-Hill Book Co., Inc., New York, N.Y. 1960). An exemplary function generator is illustrated in U.S. patent application Ser. No. 740,333 filed Nov. 9, 1976, and assigned to the General Electric Company.

Referring again to FIG. 1, a power resistance element 70 is shown connected in parallel circuit arrangement with diode 22. Resistance element 70 provides a reverse current path between motor armature 16 and generator 14. The value of resistance element 70 is preferably selected to be only as large as is necessary to limit the maximum regenerated current to within the flashover limits of the motor 18. A typical value may be approximately one ohm. As will be apparent, when the control is released allowing prime mover 12 to slow, the terminal voltage of generator 14 will be reduced at a rate faster than the terminal voltage or counterelectromotive force (CEMF) of motor armature 16, assuming that at the time of releasing the speed control pedal that the CEMF of the armature 16 is substantially equal to the terminal voltage of generator 14. A reduction in the power supplied from generator 14 to motor armature 16 will result in a reduction of the horsepower developed by motor 18. In the present embodiment wherein the motor is part of a propulsion system for a traction vehicle, a reduction in power output of the motor 18 will result in a slowing of the vehicle. However, the momentum of the vehicle will cause it to continue to move so that the interconnections between the vehicle wheels and the motor 18 will cause the motor armature 16 to continue to rotate. When the generator 14 terminal voltage becomes less than the CEMF to motor armature 16, diode 22 will be reversed biased. Reversal of current flow will then be accomplished by current passing through resistance element 70. This reverse current is produced by motor armature 16 since the armature 16 is being rotated and the field winding 36 continues to be excited by a minimum level of current as established by function generator 38. Resistance element 70 serves to limit the magnitude of the current produced by armature 16 and provides a power sink or load to absorb the regenerated energy. Thus, the combination of function generator 38, diode 22 and resistance element 70 acts to provide a motor torque that effects a dynamic drag on the vehicle when decelerating in response to a decrease in the magnitude of the output voltage of generator 14.

Figure 3:
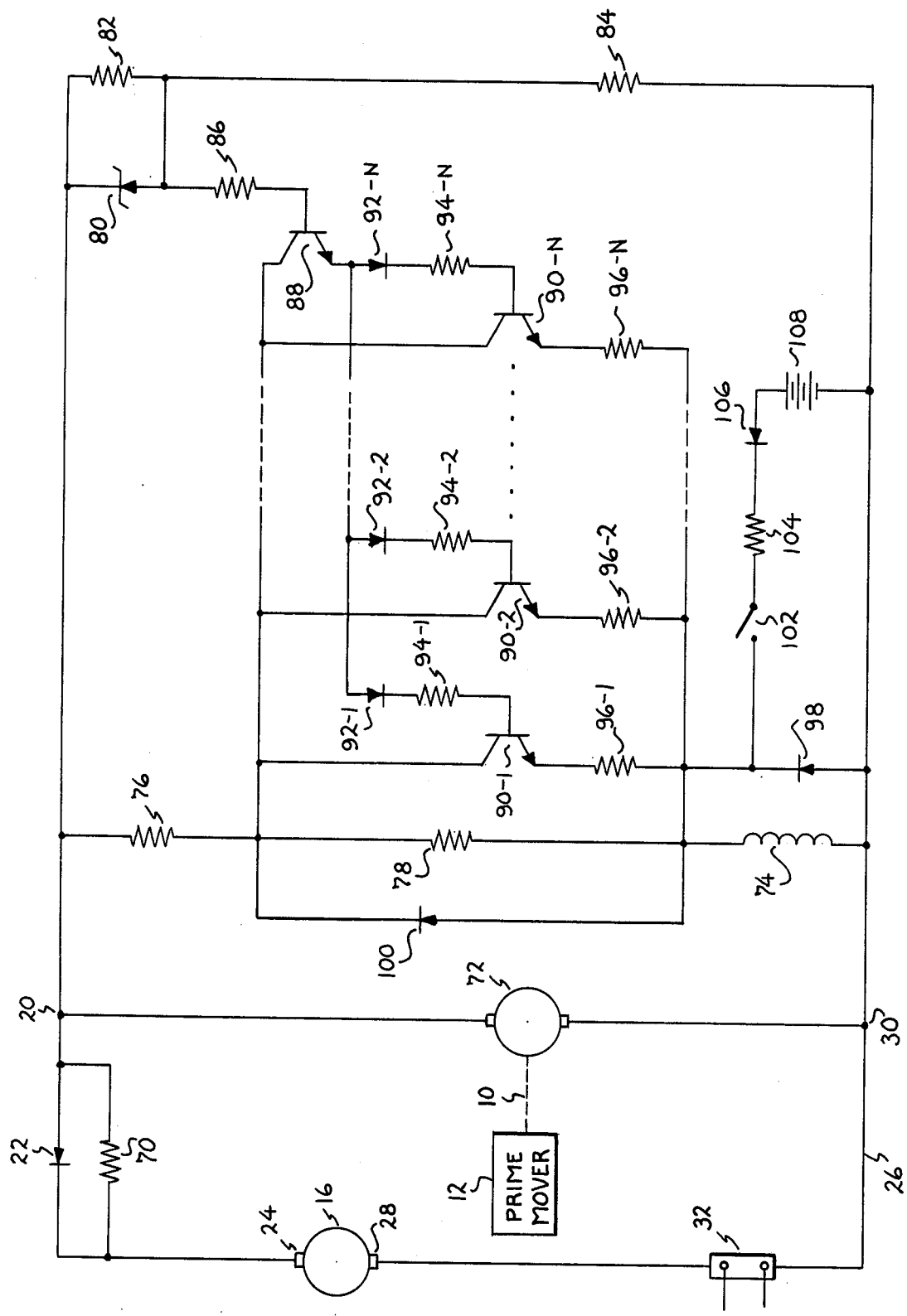
FIG. 3 is a schematic of a self-excited generator circuit suitable for use with the present invention.

Referring now to FIG. 3 there is illustrated a self-excited generator circuit suitable for use with the generator 14 to provide a controlled power output. Although self-excited generator circuits are known, the known circuits are generally for low power, constant voltage applications such as is found in a family automobile. The circuit shown in FIG. 3 is applicable to a high-power generator such as, for example, a 900 volt, 3500 ampere traction generator. Furthermore, the circuit implements a horsepower characteristic required of the generator in order to impose a constant horsepower load on the prime mover. As described in the aforementioned U.S. Pat. No. 3,105,186, such high power generators requiring a controlled horsepower output function have required use of a rotating exciter to furnish generator field excitation. It can be seen that the generator 14 comprises a generator armature 72 and a generator shunt field winding 74. The prime mover 12 is connected to drive the armature 72. First and second power resistors 76 and 78 are serially connected with field winding 74. The serial connected combination of resistors 76 and 78 and field winding 74 is connected in parallel circuit arrangement with armature 72. An emitter follower circuit is connected in parallel with power resistor 78 whereby resistor 78 may be partially or completely by-passed under selected operating conditions. The by-pass conditions are determined by the voltage breakdown rating of a Zener diode 80 which is connected in parallel with a resistor 82. Resistor 82 in combination with series connected resistor 84 form a voltage divider network which establishes a voltage at the anode of diode 80 as a function of the voltage on armature 72, resistor 82 and resistor 84 being serially connected across the output terminals of armature 72.

A junction intermediate resistors 82 and 84 is connected through a resistor 86 to a base terminal of a transistor 88 connected in an emitter follower configuration. Transistor 88 provides drive current to a plurality of emitter follower transistors 90-1, 90-2 through 90-N, the number N of the transistors depending upon the individual current rating of each transistor and the magnitude of current to be supplied to generator field winding 74. The drive current to each transistor 90-1, 90-2 through 90-N is supplied from an emitter terminal of transistor 88 to respective base terminals of each transistor 90. Isolating diodes 92-1, 92-2 through 92-N along with serially connected current limiting resistors 94-1, 94-2 through 94-N are serially connected in each base current path between transistor 88 and the transistors 90. It will be appreciated that transistor 88 in combination with each of the transistors 90-1, 90-2 through 90-N form an emitter follower circuit (a Darlington configuration) whereby the voltage at the base terminal of transistor 88 is substantially reproduced at the emitter terminals of the transistors 90. The collector terminals of each of the transistors 90 and the collector terminal of transistor 88 are connected to a junction intermediate resistors 76 and 78. The emitter terminals of each of the transistors 90 are connected through corresponding emitter resistors 96-1, 96-2 through 96-N to a junction intermediate the resistor 78 and the generator field winding 74, the emitter resistors 96 forcing current to be shared by the transistors 90. The emitter follower circuit thus acts as a current by-pass for resistor 78. Since field winding 74 constitutes an inductive load, a diode 98 is connected in parallel with winding 74 to provide a free-wheeling current path in the event of transient voltages or sudden opening of the generator circuit. A diode 100 connected in parallel with the emitter follower circuit (and resistor 78) protects the transistor circuit from reverse voltage transients.

At initial starting of the generator 14, residual magnetism in the field winding 74 will allow the armature voltage to build up under no-load conditions. However, under load conditions the residual field may be insufficient to allow a current build up. Accordingly, the generator circuit includes a switch 102 and a serially connected current limiting resistor 104 and blocking diode 106 which connect a vehicle battery 108 to the generator field winding 74. At initial starting, closure of the switch 102 will apply excitation to the winding 74 allowing the generator 14 to start operation. When the generator 14 terminal voltage becomes sufficient to allow the generator to self-excite, the switch 102 is opened and the battery 108 disconnected from the field winding 74.

Figure 4:
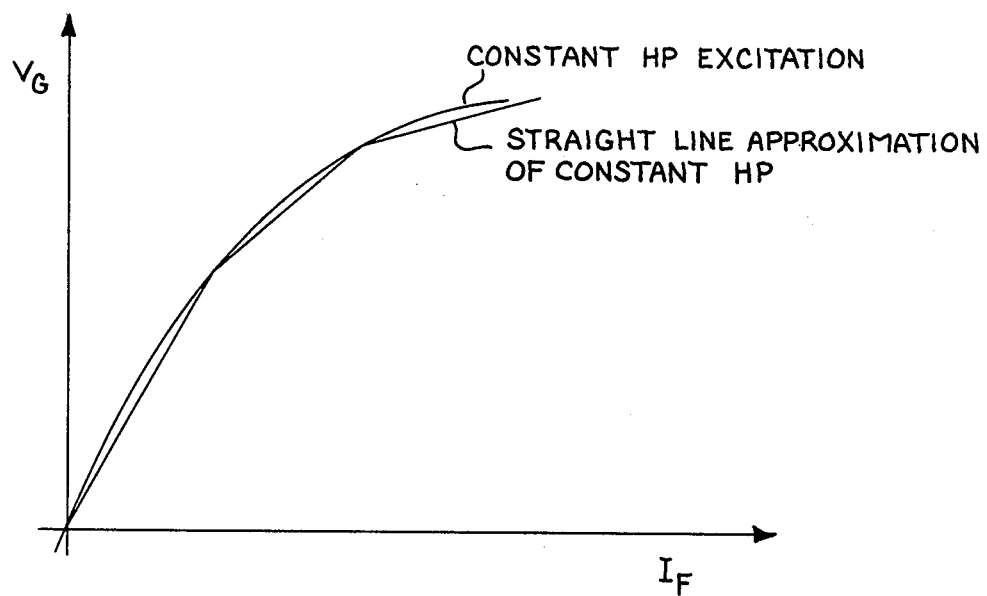
FIG. 4 is a graph illustrating desired generator armature voltage versus generator field current characteristics for constant horsepower reflection to a prime mover.

For a better understanding of the generator circuit of FIG. 3, reference should be made to the graph of FIG. 4 which illustrates the desired relationship between generator armature voltage and field current in order to reflect a constant horsepower load to the prime mover 12. The vertical axis labeled $V_G$ represents generator armature volts and the horizontal axis labeled $I_F$ represents generator field current. By continuously modifying the ratio of field current to armature volts, a curve for required constant horsepower excitation could be generated. However, the methods for continuously varying this ratio are generally economically impractical. In the illustrated embodiment of FIG. 3, a close approximation to the ideal curve is attained by varying the resistance serially located between the armature 72 and the field winding 74. The initial portion of the generator excitation curve is defined by the terminal voltage of the armature 72 divided by the sum of the resistance of resistors 76 and 78 and the resistance of the field winding 74. Subsequent sections of the curve are defined by the variation in this series resistance as the emitter follower circuit by-passes portions of the field current around the resistor 78. Once the armature voltage has attained sufficient magnitude to cause the transistors 90 to be completely saturated, the curve of armature voltage versus field current will be determined by the resistor 76 and the resistance of the field winding 74. Thus, the slope remains relatively constant and relatively shallow over this latter portion of the curve. As can be seen in FIG. 4, the constant horesepower excitation curve is approximated by straight line segments.

Figure 5:
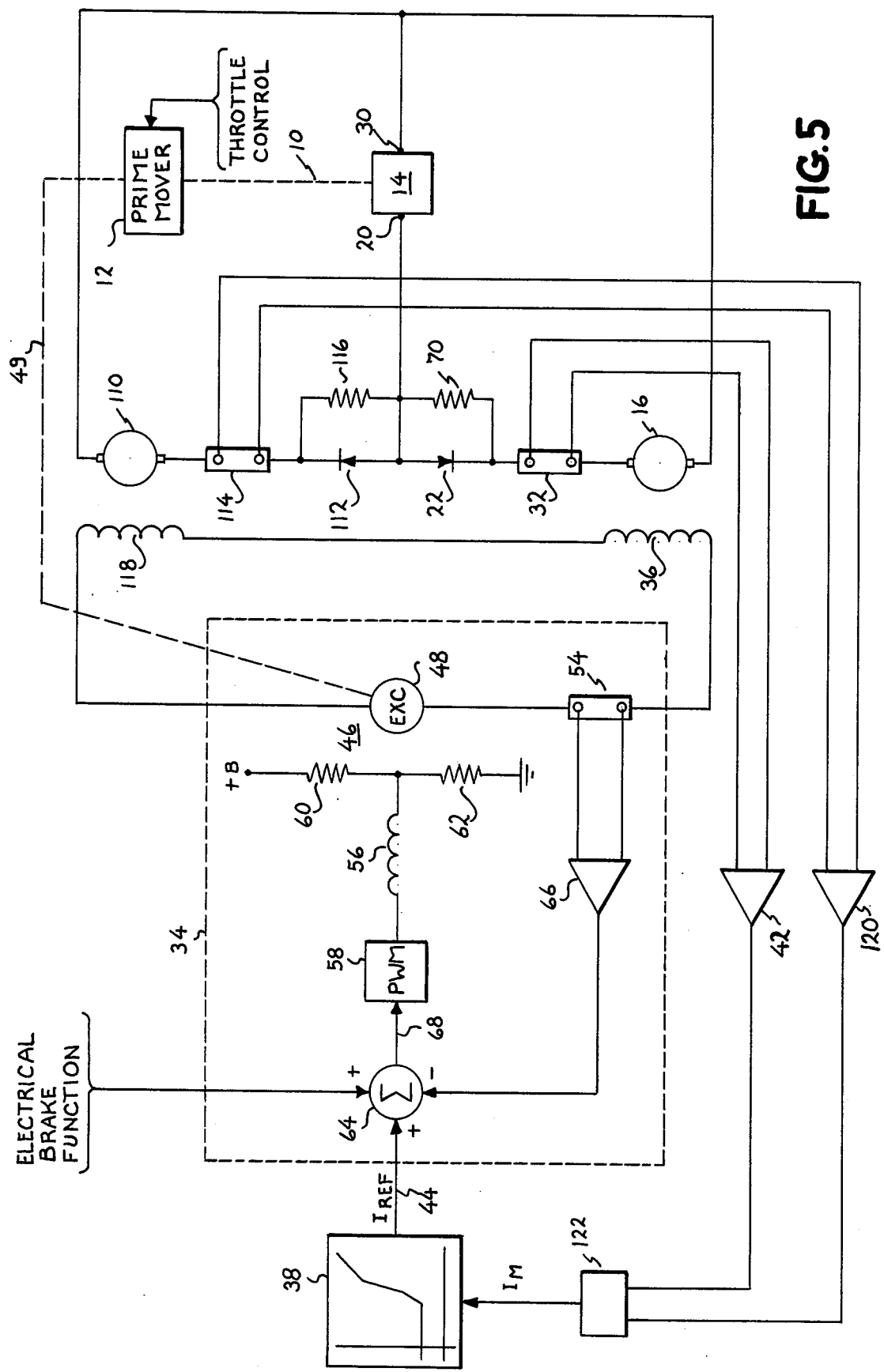
FIG. 5 is a further embodiment of the present invention as applied to a multiple traction motor vehicle.

Referring to FIG. 5 there is illustrated an application of the present invention to a multiple traction motor system. The generator 14 is connected to supply current to two parallel motor circuits, one circuit containing the motor armature 16 and a second circuit containing a second motor armature 110. It will be noted that the second circuit is identical to the first circuit which was described supra with regard to FIG. 1. Accordingly, the second circuit includes also a diode 112, a current shunt 114 and a power resistance element 116, the element 116 being connected in parallel with diode 112. The diodes 22 and 112 are poled such that the two motor circuits are substantially electrically isolated.

The function generator 38 and motor field excitation source 34 remain unchanged in the embodiment of FIG. 5. However, the motor field winding circuit is modified to the extent of connecting a field winding 118, associated with motor armature 110, in series circuit with field winding 36 whereby the source 34 supplies the same current to both field windings. In addition, the armature current in both the armature circuits is monitored, a differential amplifier 120 being connected to current shunt 114 for providing a signal representative of current in armature 110. The current signal supplied by amplifier 120 and the current signal supplied by amplifier 42 are compared in an analog OR circuit 122. OR circuit 122 provides an output signal representative of the largest positive magnitude of the two input current signals. This output signal is applied to function generator 38 for producing the aforementioned current reference signal $I_{REF}$.

As will be appreciated, the operation of the system of FIG. 5 is substantially identical to that of FIG. 1. The primary difference between the two embodiments lies in the use of two parallel connected motor circuits in FIG. 5. Clearly the system could be further expanded to include further parallel motor circuits so long as the capability of source 34 and generator 14 are not exceeded. It is also reasonable to incorporate more than one motor armature in each of the parallel motor circuits to thereby construct a series-parallel motor arrangement of a type well known in the traction motor art.

It will be apparent to those skilled in the art that the present invention has been described in the context of a unidirectional rotating motor system. Clearly, the system could be adapted for bi-directional motion by incorporation of motor field winding current reversing apparatus such as, for example, switches for reversing the motor field winding connections. In addition, the system could incorporate electrical braking, either dynamic or regenerative, by providing an additional current command signal to summing junction 64 as a function of a desired braking effort. The incorporation of an electrical braking function is indicated in FIGS. 1 and 5 by the command signal line labeled Electrical Brake Function which is applied to summing junction 64. The Electrical Brake Function may be supplied from a function generator similar to generator 38 but having a desired braking function rather than a motoring function. As is apparent, during electrical braking the $I_{REF}$ signal is at a minimum level and can be overridden by the applied braking function.

Although the present invention has been described in an embodiment for effecting a single level of dynamic drag in response to release of a speed control pedal, there will become obvious to those skilled in the art other modifications, arrangements and adaptions of the present invention including multiple levels of dynamic drag. Accordingly, it is intended that the invention not be limited to the illustrated embodiment but that the appended claims be interpreted in view of the true spirit and scope of the invention.

What we claim and desire to secure by Letters Patent of the United States is:

1. In a propulsion system for traction vehicles utilizing separately excited electric traction motor means, the improvement comprising:
   a. at least one direct current electric traction motor having an armature and a field winding;
   b. a first controllable electrical power source;
   c. control means associated with said first source for increasing and decreasing the magnitude of its output voltage as desired;
   d. conducting means for interconnecting said motor armature and said first source in a closed armature current circuit, said conducting means including means for introducing current limiting impedance means into said armature current circuit when the voltage of said first source is less than the CEMF of said armature;
   e. means for providing a first signal representative of the magnitude and polarity of current through said motor armature;
   f. function generator means for providing a field current reference signal having a predetermined minimum value and varying above said minimum value as a predetermined function of a signel applied to a signal input terminal thereof;
   g. means for coupling said first signal to said signal input terminal of said function generator;
   h. a second controllable electrical power source for providing a variable output excitation at output terminals thereof in response to a signal applied to a signal input terminal thereof;
   i. means for coupling said field current reference signal to said signal input terminal of said second source; and
   j. means for interconnecting said output terminals of said second source to said motor field winding whereby the magnitude of current in said motor field winding is controlled in response to said current reference signal and said predetermined minimum value of said current reference signal results in a level of motor torque that effects a dynamic drag on said vehicle when decelerating in response to a decrease in the magnitude of the output voltage of said first source.

2. The improvement of claim 1 wherein said function generator means is operative to vary said field current reference signal above said minimum value as a predetermined function of the signal applied to its signal input terminal when the latter signal is representative of motor armature current above a predetermined threshold that flows when the output voltage of said first source is greater than the motor armature CEMF.

3. The improvement of claim 1 wherein said conducting means comprises:

a. unidirectional conduction means poled to conduct current when said first source voltage is of greater magnitude than said armature CEMF; and b. resistance means connected in parallel circuit arrangement with said unidirectional conduction means.

4. The improvement of claim 3 wherein said unidirectional conduction means comprises a plurality of semiconductor diodes.

5. The improvement of claim 1 wherein said first electrical power source comprises:

a. a self-excited generator having an armature and a field winding;

b. means for interconnecting said generator armature and said generator field winding whereby excitation of said generator field winding is functionally dependent on the magnitude of voltage on said generator armature; and c. a prime mover connected to rotatably drive said generator armature, said prime mover being responsive to said control to vary the rotational velocity of said generator armature.

6. The improvement of claim 3 wherein said means for interconnecting said generator armature and field winding comprises:

a. resistance means interconnecting said generator field winding in parallel circuit arrangement with said generator armature;

b. continuously variable current control means connected in parallel circuit arrangement with at least a portion of said resistance means; and c. means connected to said generator armature and responsive to the magnitude of voltage generated thereby to control the conductivity of said variable current control means as a function of the generator armature terminal voltage.

7. The improvement of claim 6 wherein said functional relationship between the current in said generator field winding and the terminal voltage of said generator armature is such that said generator reflects a substantially constant horsepower load to said prime mover.

8. The improvement of claim 7 wherein said variable current control means comprises a plurality of parallel connected emitter follower transistor circuits, base terminals of each of said transistor circuits being connected to a current amplifier having an output current determined by the terminal voltage of said generator armature.

9. The improvement of claim 1 and including:

a. a second separately excited electric traction motor having an armature and a field winding;

b. means for interconnecting said second motor armature and said first source in a second closed armature current circuit, said interconnecting means including means for introducing current limiting impedance means into said second armature current circuit when the voltage of said first source is less than the CEMF of said second motor armature;

c. means for providing a second signal representative of the magnitude of current through said second motor armature;

d. comparing means connected for receiving said first signal and said second signal, said comparing means providing an output signal representative of the larger magnitude of said first and second signals;

e. means for connecting an output terminal of said comparing means to an input terminal of said function generator whereby the current reference produced by said function generator is responsive to the larger magnitude of said first and second signals;

f. means for interconnecting said second motor field winding in series circuit arrangement with said first motor field winding; and g. means for connecting the serial combination of said first and second motor field windings to said output terminals of said second electrical power source.

10. The improvement of claim 5 wherein said second electrical source comprises:

a. a rotating exciter having a field winding and an armature, said exciter armature being connected to be rotatably driven by said prime mover, output terminals of said exciter armature being connected to said motor field winding for supplying excitation thereto;

b. current sensing means connected for sensing current in said motor field winding and for supplying an output signal representative thereof;

c. a summing junction having a first input terminal connected for receiving said current reference signal and a second input terminal connected for receiving said output signal from said current sensing means, said summing junction providing an error signal representative of the difference between said current reference signal and said output signal; and d. a pulse width modulator connected for supplying excitation to said exciter field winding, said pulse width modulator being connected for receiving said error signal and being responsive thereto to control the excitation to said exciter field winding in a manner to minimize said error signal.

11. The improvement of claim 10 and including means for connecting an electrical brake function signal to said summing junction, said brake function signal being effective to control the motor field current excitation level when said vehicle is operated in an electrical braking mode.

12. The improvement of claim 1 wherein said predetermined minimum value of said field current reference signal is selected such that the maximum value of motor field current in dynamic drag is appoximately 25 percent of the maximum rated motor field current.

* * * * *